(12) United States Patent
Ogura (10) Patent No.: US 9,811,943 B2
(45) Date of Patent: Nov. 7, 2017

(54) PROCESSING DEVICE FOR LABEL INFORMATION FOR MULTI-VIEWPOINT IMAGES AND PROCESSING METHOD FOR LABEL INFORMATION

(71) Applicant: Panasonic Intellectual Property Management Co., Ltd., Osaka (JP)

(72) Inventor: Yasunobu Ogura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/076,655

(22) Filed: Mar. 22, 2016

(65) Prior Publication Data
US 2016/0217605 A1  Jul. 28, 2016

Related U.S. Application Data

(63) Continuation of application No. PCT/JP2015/001464, filed on Mar. 17, 2015.

(30) Foreign Application Priority Data

Mar. 17, 2014 (JP) ................................ 2014-053056

(51) Int. Cl.
*G06T 15/20* (2011.01)
*G06T 7/00* (2017.01)
(Continued)

(52) U.S. Cl.
CPC ............... *G06T 15/20* (2013.01); *G06K 9/52* (2013.01); *G06K 9/6267* (2013.01); *G06T 7/60* (2013.01);
(Continued)

(58) Field of Classification Search
None
See application file for complete search history.

(56) References Cited

U.S. PATENT DOCUMENTS

2004/0004615 A1  1/2004  Hiraga et al.
2008/0247635 A1  10/2008  Davis et al.
(Continued)

FOREIGN PATENT DOCUMENTS

| | | |
|---|---|---|
| JP | 2002-163678 | 6/2002 |
| JP | 2009-212728 | 9/2009 |
| WO | 2011/029209 | 3/2011 |

OTHER PUBLICATIONS

Extended European Search Report dated Feb. 13, 2017 in corresponding European Application No. 15765858.4.
(Continued)

*Primary Examiner* — Yi Wang
(74) *Attorney, Agent, or Firm* — Wenderoth, Lind & Ponack, L.L.P.

(57) ABSTRACT

A label-information processing device for a multi-viewpoint image, which contains images by image signals of a subject photographed from multi-viewpoints, assigns label-information to a remarkable-portion common to the images. The device includes: a display unit for displaying a specific image by a specific image signal which depicts the remarkable-portion; and a controller for assigning the label-information to the remarkable-portion depicted in the specific image. The controller has the functions of: acquiring coordinates of the label-information in a three-dimensional space; displaying, on the display unit, the images by the image signals which depict the same remarkable-portions as that in the specific image; transforming the thus-acquired coordinates of the label-information into coordinates at which the label-information on a plane is assigned to the thus-displayed image signals having different viewpoints;

(Continued)

and assigning the label information to the image signals having different viewpoints at the positions that are determined from the thus-transformed coordinates.

6 Claims, 8 Drawing Sheets

(51) Int. Cl.
    *G06K 9/52*         (2006.01)
    *G06K 9/62*         (2006.01)
    *G06T 7/60*          (2017.01)
    *G06T 19/00*       (2011.01)
    *G06T 7/73*          (2017.01)
    *G06K 9/46*         (2006.01)

(52) U.S. Cl.
    CPC ............... *G06T 7/74* (2017.01); *G06T 19/00* (2013.01); *G06K 2009/4666* (2013.01); *G06T 2200/04* (2013.01); *G06T 2207/30244* (2013.01)

(56) References Cited

U.S. PATENT DOCUMENTS

2012/0154446 A1*   6/2012   Adams ................. G06T 3/0081
                                                       345/661
2012/0327074 A1*  12/2012   Lee .................... H04N 13/0404
                                                       345/419

OTHER PUBLICATIONS

International Search Report of PCT application No. PCT/JP2015/001464 dated Jun. 9, 2015.

* cited by examiner

PROCESSING DEVICE FOR LABEL INFORMATION FOR MULTI-VIEWPOINT IMAGES AND PROCESSING METHOD FOR LABEL INFORMATION

BACKGROUND

1. Field

The technology according to the present disclosure relates to label-information processing devices. Such a device is intended to assign the label information for portions of interest of a multi-viewpoint image which is obtained by photographing a subject from multi-viewpoints.

2. Description of the Related Art

Japanese Patent Unexamined Publication No. 2009-212728 discloses the stereoscopic video processor which is capable of easily taking multi-viewpoint images by using only a single camera.

SUMMARY

The technology according to the present disclosure provides a label-information processing device for a multi-viewpoint image that is configured with images based on a plurality of image signals obtained by photographing a specific subject from a plurality of viewpoints. The processing device processes label information such that the label information is assigned to a remarkable portion that is depicted in and common to the images.

The processing device includes a display unit for displaying a specific image based on a specific image signal in which the remarkable portion is depicted, and a controller for assigning the label information to the remarkable portion of the specific image that is displayed on the display unit based on the specific image signal. The controller first, second, third, and fourth functions. The first function is for acquiring coordinates, in a three-dimensional space, of the label information in a coordinate space, with such coordinates being ones in the coordinate space which has been used to express the subject in the three-dimensional space. The second function is for displaying, on the display unit, other images based on other image signals, which are different in viewpoint from the specific image based on the specific image signal, with such image signals depicting the same remarkable portion as that is depicted by the specific image signal. The third function is for transforming the coordinates, which have been acquired by the first function, of the label information into coordinates of the label information on a plane. The thus-transformed coordinates are to be used for assigning the label information, on a per image signal basis, to the image signals with the image signal having different viewpoints from each other and being displayed by the second function. The fourth function is for assigning the label information, on a per image signal basis, to the image signals having the different viewpoints from each other, at coordinate positions predetermined from the coordinates having been acquired by the third function.

In accordance with the technology disclosed herein, in cases where label information is assigned to image signals that are obtained by photographing one subject from a plurality of viewpoints, the positions in a three-dimensional space can be easily confirmed at which the label information is assigned.

DETAILED DESCRIPTION

Hereinafter, descriptions will be made regarding a method of processing of label information for a multi-viewpoint image signal and a label-information processing device for the label information, in accordance with an embodiment according to the technology disclosed herein, with reference to the accompanying drawings. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art. It is noted that the present inventors provide the accompanying drawings and the following descriptions so as to facilitate fully understanding of the technology disclosed herein by those skilled in the art. The inventors in no way intend for the present disclosure to impose any limitation on the subject matter described in the appended claims.

Figure 1:
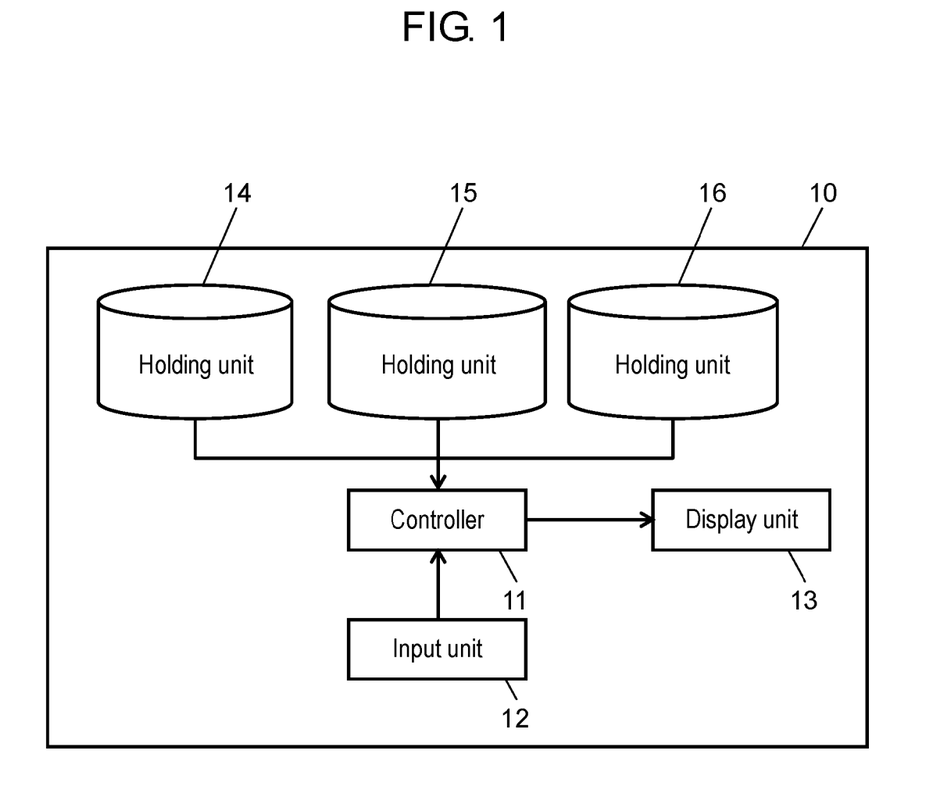
FIG. 1 is a block diagram of a configuration of a label-information processing device for a multi-viewpoint image, in accordance with an embodiment according to the technology of the present disclosure.

FIG. 1 is a block diagram of a configuration of the label-information processing device for a multi-viewpoint image, in accordance with the embodiment according to the technology disclosed herein.

As shown in FIG. 1, label-information processing device 10 includes controller 11, input unit 12, display unit 13, model-data holding unit 14 for holding model data, calibration-data holding unit 15 for holding calibration data, and multi-viewpoint image-signal holding unit 16 for holding multi-viewpoint image signals.

Controller 11 controls the whole of label-information processing device 10 in accordance with a computer program given by software or firmware. Controller 11 performs a predetermined operation in accordance with a control signal which is inputted via input unit 12. Moreover, controller 11 reads information from model-data holding unit 14 and calibration-data holding unit 15, on an as-needed basis, and then processes the information. Furthermore, controller 11 reads a multi-viewpoint image from multi-viewpoint image-signal holding unit 16, and displays the image on display unit 13.

Moreover, controller 11 has the following control functions (1) to (4). That is, (1) First function of acquiring coordinates of the label information in a three-dimensional space;

(2) Second function of selecting at least one or more specific image signals from a plurality of the image signals that are accumulated in multi-viewpoint image-signal holding unit 16;

(3) Third function of calculating coordinates, on a plane, of the image signals selected by carrying out function (2), in accordance with the coordinates of the label information in the three-dimensional space; and (4) Fourth function of forming image signals, on which the label information is superimposed at the coordinate positions of the label information on the selected image signals, and outputting the thus-formed image signals to display unit 13.

Next, each of the functions of controller 11 will be described.

Function (1) described above includes the following operation. That is, when a control signal is inputted via input unit 12, with the signal indicating a position at which the label information is to be assigned, the controller acquires, by calculation, coordinates of the indicated position of the label information in the three-dimensional space. Here, the label information is additional information which is assigned to remarkable portions of the plurality of the image signals that are stored in multi-viewpoint image-signal holding unit 16. That is, a user can assign the label information to the image signal, via input unit 12. This assignment enables the user to view both the remarkable portion and the label information, simultaneously on display unit 13. This can facilitate a user's deeper understanding of the remarkable portion.

The remarkable portion is one which indicates a portion of a specific subject depicted by the image signal. For example, the portion may be a hand, leg, etc. of a person. When the remarkable portion is the hand of the person, the label information may be characters and the like to introduce the person's hand. The user can read the label information to understand features and the like of the hand of the person depicted by the image signal.

Moreover, the coordinates of the label information in the three-dimensional space are coordinates with respect to coordinate axes that have been used to project a predetermined subject into the three-dimensional space. Such a predetermined subject is depicted by one of the image signals stored in multi-viewpoint image-signal holding unit 16. That is, by designating the coordinates of the label information in the three-dimensional space, the position of the label information is specified in the image signal stored in multi-viewpoint image-signal holding unit 16. Note that the operation of calculating the coordinates of the label information in the three-dimensional space will be described later.

Function (2) described above includes the following operation. That is, controller 11 selects an image signal from the image signals stored in multi-viewpoint image-signal holding unit 16. The thus-selected image signal is one that the user can view to identify the remarkable portion to which the label information is to be assigned, when the image signal is displayed on display unit 13. This operation of selecting the image signal will be described later.

Function (3) described above includes the following operation. Controller 11 transforms, by calculation, the coordinates of the label information in the three-dimensional space with the coordinates having already been obtained by carrying out function (1) described above, into coordinates on a plane on which the image signal fed to display unit 13 is projected. Controller 11 outputs the thus-transformed coordinates to display unit 13. This configuration allows the following advantage. That is, even if controller 11 selects another image signal with a different viewpoint, from multi-viewpoint image-signal holding unit 16, the controller can superimpose the label information onto the thus-selected image signal and display it. This is because the controller can calculate coordinates of the label information on a plane involving the thus-selected image signal, from the coordinates of the label information in the three-dimensional space.

Function (4) described above includes the following operation. Controller 11 superimposes, on the image signal, the label information selected by carrying out function (2) based on the coordinates of the label information calculated by carrying out function (3), thereby forming a new image signal. Controller 11 outputs the thus-formed new image signal to display unit 13.

Next, input unit 12 is a device that receives operation instructions for label-information processing device 10 from the user. Input unit 12 is configured with a pointing device such as a mouse; however, it may use another device including a touch panel and a keyboard. That is, the input unit may utilize any other device as long as it can receive the operation instructions from the user.

Upon receiving the operation instructions from the user, input unit 12 forms a control signal in response to the operation instructions and then outputs the resulting signal to controller 11.

Display unit 13 is a device that displays the image signal output from controller 11. Display unit 13 acquires the image signal from controller 11 and displays the acquired image signal.

Model-data holding unit 14 stores model data which indicate the position of a common subject in the three-dimensional space, with the common subject being depicted by and common to the plurality of the image signals stored in multi-viewpoint image-signal holding unit 16. Here, the model data are discrete points which are optionally set on at least the surface of the object, and configured with an aggregate of position coordinates in the three-dimensional space. Controller 11 can refer to the model data stored in model-data holding unit 14, thereby calculating the coordinates of the label information in the three-dimensional space and the coordinates of the label information on the plane on which the image signal is projected.

Note that the model data stored in model-data holding unit 14 may be polygon data which are a set of the points described above with additional connection information between the points. Moreover, the model data stored in model-data holding unit 14 may also be a three-dimensional point group that is estimated, by a Structure-from-Motion Algorithm, from the plurality of the image signals stored in multi-viewpoint image-signal holding unit 16. Such a three-dimensional point group may be formed based on a depth image which is calculated, by stereo matching, from a pair of images photographed with a calibrated camera. Furthermore, the polygon data may also be formed by approximating the contour of a subject by means of 3-D modeling software commercially available.

Calibration-data holding unit 15 accumulates camera parameters which each have been used when the corresponding image signal stored in multi-viewpoint image-signal holding unit 16 is photographed. These camera parameters are information including at least three-dimensional camera position coordinates, a camera attitude (rotation matrix and parallel translation vector), a focal length, and the center of pixels. Moreover, calibration-data holding unit 15 accumulates viewpoint-position information that is stored in multi-viewpoint image-signal holding unit 16.

Note that, such camera parameters may be ones that are estimated, by a Structure-from-Motion Algorithm, from the plurality of the image signals stored in multi-viewpoint image-signal holding unit 16. Note that, the camera parameters may be a camera position and attitude, which is calculated from the information on photographing, i.e. camera internal parameters (the focal length and the center of pixels) and control parameters of a turntable and a robot arm.

The data, which are stored in model-data holding unit 14 and calibration-data holding unit 15, include the information on the coordinates in the three-dimensional space. That is, model-data holding unit 14 accumulates the position coordinates of the discrete points that are optionally set on the surface of the object, with the position coordinates being regarded as the information on the coordinates in the three-dimensional space. In addition, calibration-data holding unit 15 accumulates the position information of the camera, as the camera parameters, which is used to photograph the images, i.e. the image signals accumulated in multi-viewpoint image-signal holding unit 16. In this way, a plurality of pieces of the information in the three-dimensional space is present. For the sake of convenience, these pieces of the information preferably share the identical coordinate system.

Multi-viewpoint image-signal holding unit 16 accumulates at least the plurality of the image signals, and information on file paths of the image signals and on the viewpoint positions of the photographing.

Here, the plurality of the image signals accumulated in multi-viewpoint image-signal holding unit 16 may be made in the following photographing manner. An object is placed on a turntable, while a camera is mounted on a robot arm. The turntable and robot arm are controlled such that a photographing position can be defined by one of the discrete points which are separated longitudinally and latitudinally from each other and lie on the surface of a hemisphere with radius R originating from the rotation center point of the turntable. In addition, the camera attitude is controlled via the robot arm such that the optical axis of the camera passes through the origin of the hemisphere.

Note that the viewpoint-position information described above includes at least the position information on the longitude and latitude. Moreover, the photographing may be carried out with the camera being set at a position on a plane in the three-dimensional space. In this case, the viewpoint-position information includes at least two-dimensional coordinates with respect to the origin.

Next, an operation of label-information processing device 10 will be described with reference to the drawings.

Figure 2:
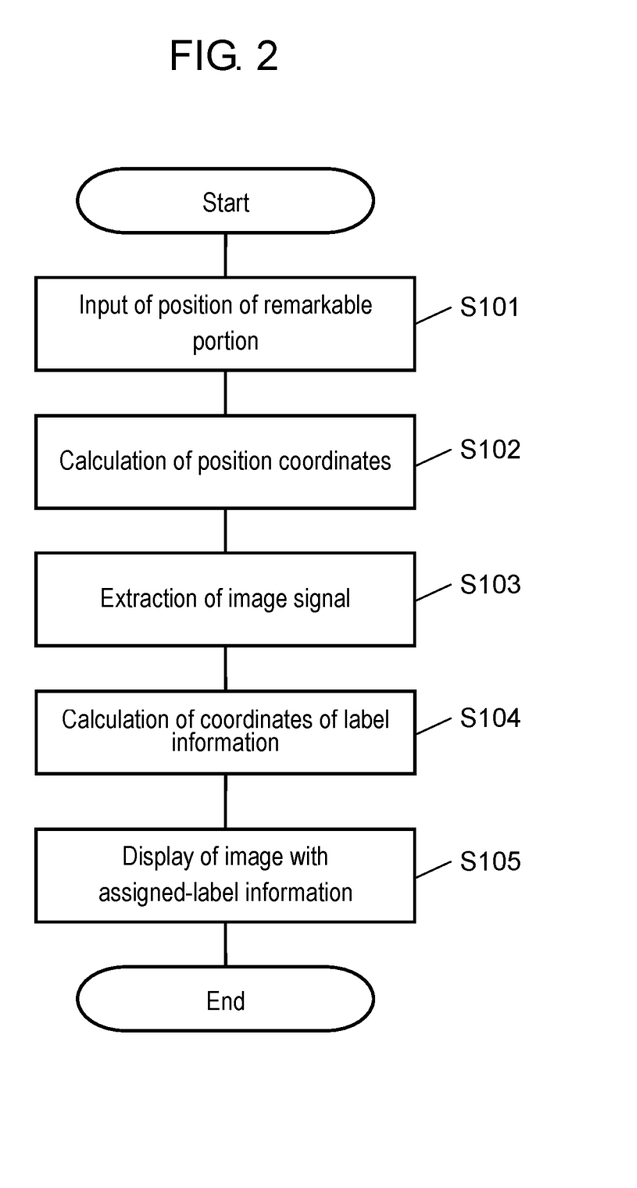
FIG. 2 is a flowchart illustrating an operation of the whole of the label-information processing device according to the embodiment.

FIG. 2 is a flowchart illustrating the operation of the whole of label-information processing device 10 according to the embodiment.

For the sake of the description hereinafter, the operation is assumed to start with a display status in which display unit 13 is displaying a predetermined image signal among the image signals stored in multi-viewpoint image-signal holding unit 16.

First, the user operates input unit 12 so as to change the image signal displayed on display unit 13 such that a remarkable portion to which the user wants to assign desired label information is distinctly displayed. Here, multi-viewpoint image-signal holding unit 16 has accumulated a plurality of the image signals obtained by photographing one subject from various viewpoints. Accordingly, such a user's operation of changing the image signal results in a change in viewpoint from which the one subject was photographed.

Figure 3:
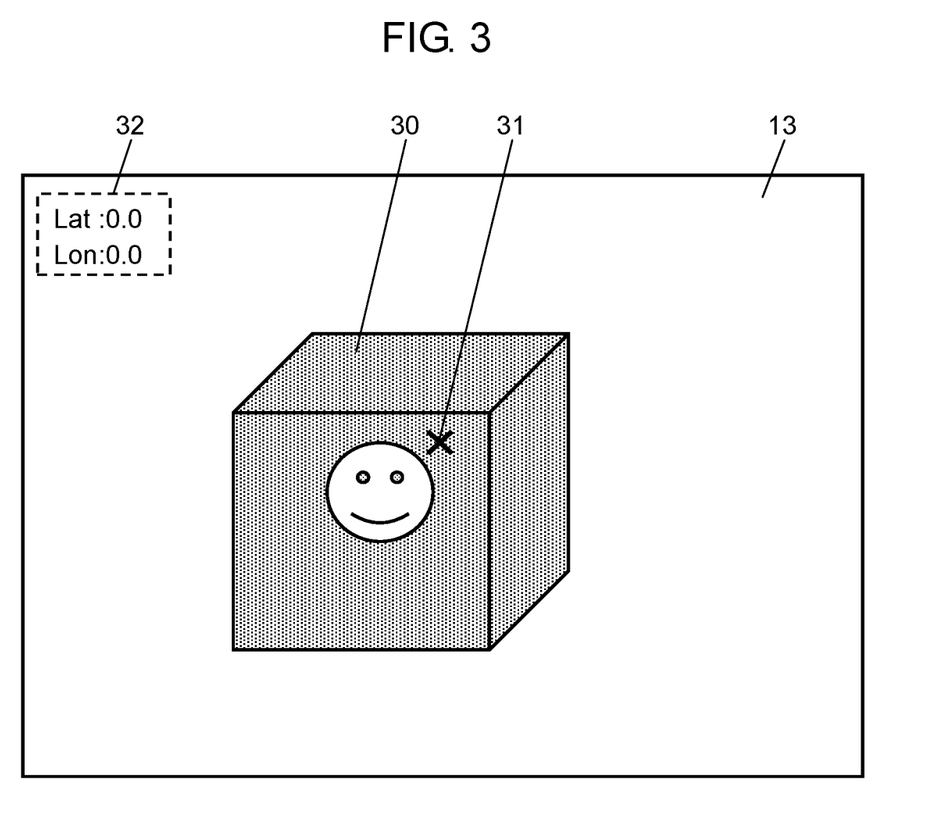
FIG. 3 is an illustrative view of an example of an image displayed on a display unit.

FIG. 3 is an illustrative view of an example of the image displayed on display unit 13. As a result of changing the image signal, image 30 as shown in FIG. 3 is displayed. Image 30 is one which distinctly shows remarkable portion 31. Coordinates 32 indicate the position of remarkable portion 31.

In Step S101 of FIG. 2, when display unit 13 displays image 30 which distinctly shows remarkable portion 31, the user specifies the position at which the label information is to be assigned, via input unit 12. At this time, the user designates, via input unit 12, coordinate data which indicate remarkable portion 31 of image 30 displayed on display unit 13. In this case, upon receiving such an instruction from the user, input unit 12 outputs, to controller 11, a control signal corresponding to the instruction. In such a case where remarkable portion 31 is specified via input unit 12, coordinates 32 indicating the thus-specified position may be shown in the upper-left portion of the image displayed on display unit 13.

Next, controller 11 acquires the control signal output from input unit 12. Controller 11 acquires absolute coordinates of the label information in a coordinate space based on the acquired control signal and the camera parameters for the image signal currently being displayed on display unit 13. Such absolute coordinates are ones in the coordinate space that has been used to express the subject in the three-dimensional space. That is, in Step S101, the controller calculates the coordinates in the three-dimensional space. Such coordinates indicate the position, designated by the user, of the remarkable portion to which the label information has been assigned. Note that controller 11 acquires the camera parameters from calibration-data holding unit 15 as is appropriate (Step S102).

Next, controller 11 extracts an image signal different from the image signal currently being displayed on display unit 13, based on both the coordinates of the position designated by the user in the three-dimensional space and the model data accumulated in model-data holding unit 14. The newly extracted image signal is an image signal of an image which is different in viewpoint from the image based on a specific image signal, and includes one of at least one or more image signals which depict the same remarkable portion as that is depicted by the specific image signal. The new image signal is extracted from multi-viewpoint image-signal holding unit 16 and displayed on display unit 13 (Step S103).

Next, controller 11 uses the information accumulated in both model-data holding unit 14 and calibration-data holding unit 15, thereby projecting the three-dimensional coordinates calculated in Step S102 onto the plane of each of the image signals selected by the extraction in Step S103. That is, controller 11 calculates coordinates at which the label information is assigned on the plane of each of the image signals having different viewpoints from each other, with the image signals having been selected by the extraction in Step S103, based on the absolute coordinates of the label information that have been acquired in Steps S101 and S102 (Step S104).

Finally, controller 11 outputs, to display unit 13, the image signal to which the label information is assigned at the predetermined position of the image signal with the different viewpoint, with the predetermined position having been calculated in Step S104. Then display unit 13 displays the plurality of the image signals output from controller 11 (Step S105).

Figure 4:
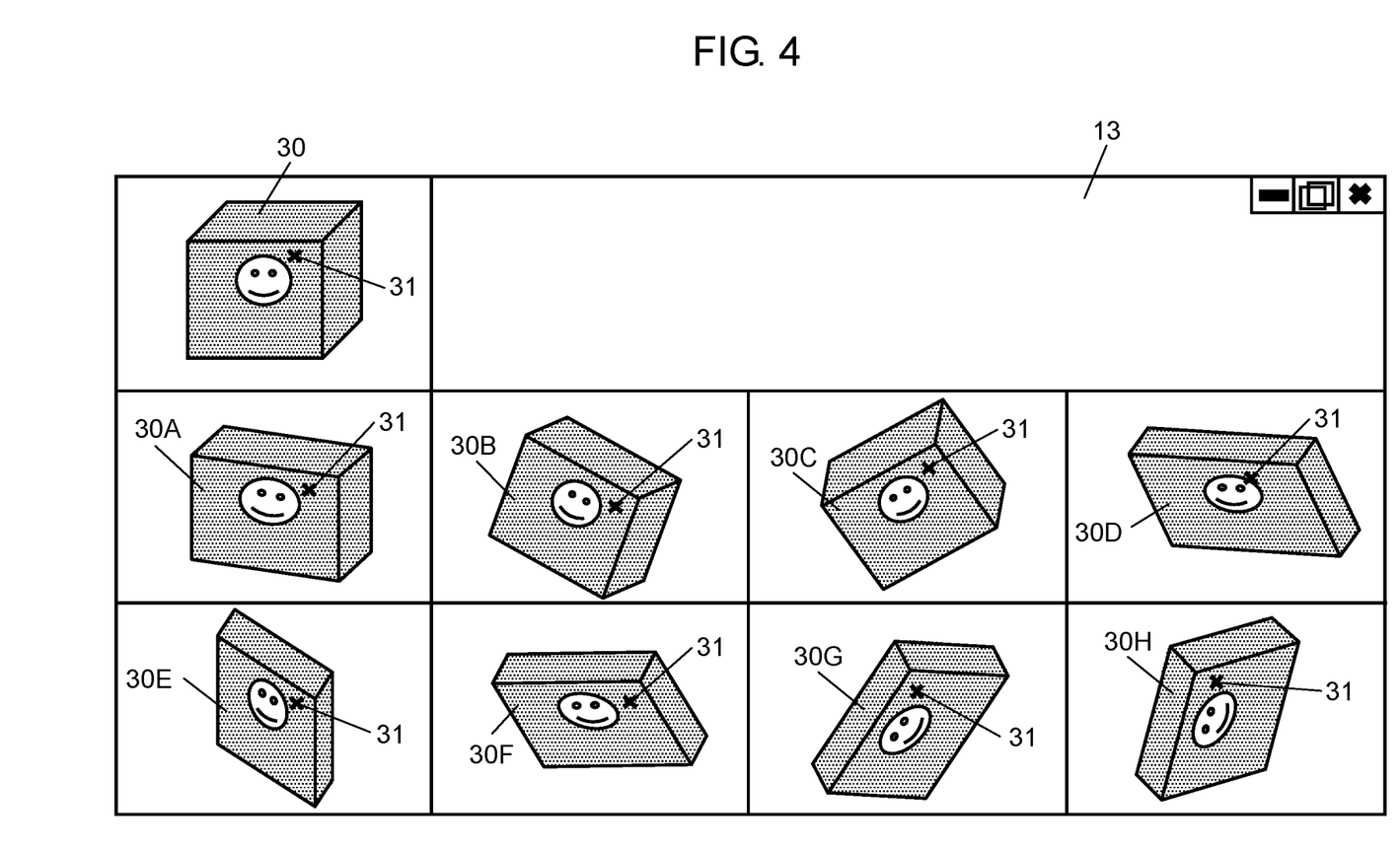
FIG. 4 is an illustrative view of an example of images displayed on the display unit, with the images being formed based on a plurality of image signals.

FIG. 4 is an illustrative view of an example of the images displayed on the display unit, with the images being formed based on the plurality of the image signals. As shown in FIG. 4, in addition to image 30 of the image signal that has initially been displayed on display unit 13, a plurality of other images 30A, 30B, 30C, 30D, 30E, 30F, 30G, and 30H is displayed together, with remarkable portion 31 being depicted in each of these images.

This configuration makes it possible to show, to the user, the positions of the label information from the various viewpoints. Therefore, the viewing and confirming of only these images is enough for the user to determine whether or not the spatial position where the label information is assigned is appropriate.

Next, each of functions (1) and (2) described above of controller 11 will be specifically described.

Figure 5:
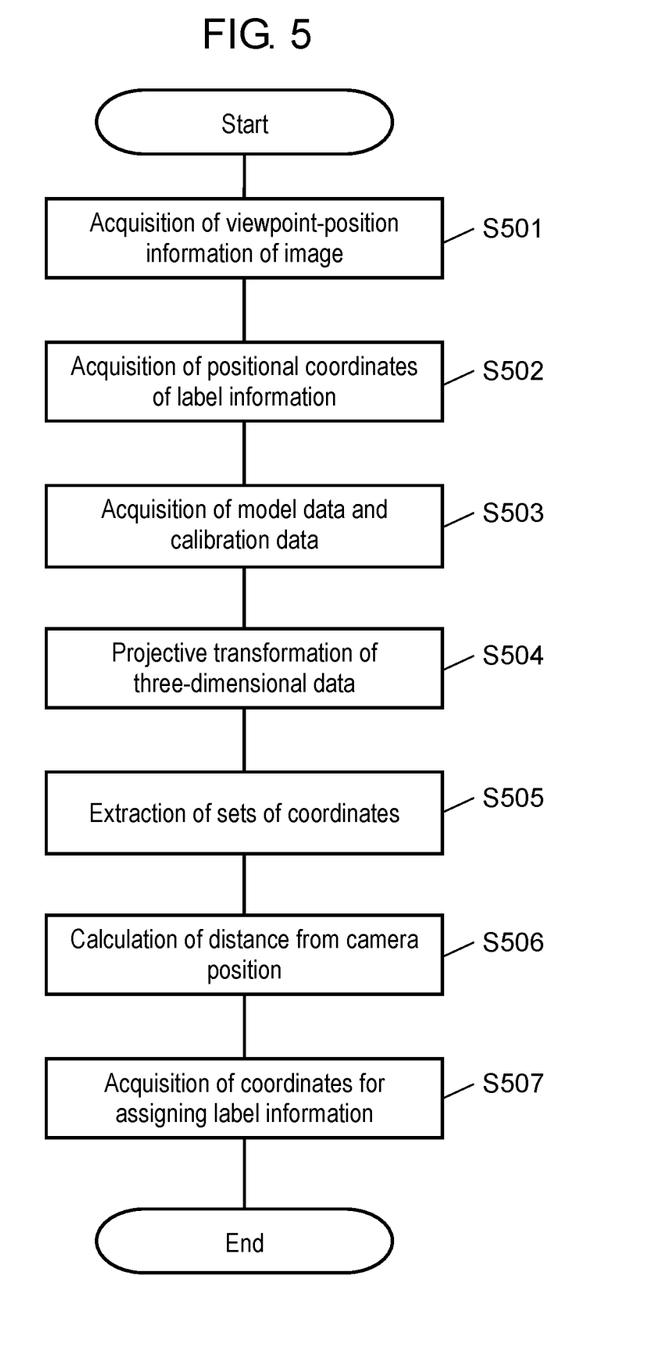
FIG. 5 is a flowchart illustrating a function of a controller for calculating coordinates of the label information in a three-dimensional space.

(1) Function of Calculating Coordinates of Label Information in Three-Dimensional Space FIG. 5 is a flowchart illustrating the function of controller 11 for calculating the coordinates of the label information in the three-dimensional space.

In FIG. 5, controller 11 starts by acquiring the viewpoint-position information (latitude and longitude) of the image signal displayed on display unit 13 (Step S501).

Then, in the state where the image signal with distinctly-visible remarkable portion 31 is being displayed on display unit 13 in Step S101, upon receiving the control signal to specify remarkable portion 31, controller 11 acquires the position coordinates on the two-dimensional plane indicated by the control signal (Step S502). Here, the two-dimensional plane described above lies on the plane of the image signal displayed on display unit 13.

Then, controller 11 acquires calibration data, which corresponds to the viewpoint-position information acquired in Step S501, from calibration-data holding unit 15. Moreover, controller 11 acquires model data from model-data holding unit 14 (Step S503).

Then, based on the information acquired in Step S503, controller 11 projectively transforms the coordinates, in the three-dimensional space, defined by the model data for the subject into coordinates, on a one-to-one basis, on the two-dimensional plane on which the image signal is currently being displayed on display unit 13 (Step S504).

Controller 11 performs the projective transformation in accordance with Equations (1) and (2).

$$wv \begin{pmatrix} XImn \\ YImn \\ 1 \end{pmatrix} = Pv \begin{pmatrix} XMn \\ YMn \\ ZMn \\ 1 \end{pmatrix} \quad \text{(Equation 1)}$$

In the equation, "wv" is a constant (not zero) at viewpoint "v." "XImn" and "YImn" are the coordinates, on the two-dimensional plane, of the image signal that is currently being displayed on display unit 13. "XMn," "YMn," and "ZMn" are the coordinates of each of the discrete points of the subject, with the discrete points being expressed by the model data in the three-dimensional space.

Moreover, "Pv" is the following transformation matrix.

$$Pv = \begin{pmatrix} fv & 0 & Uv0 \\ 0 & fv & Vv0 \\ 0 & 0 & 1 \end{pmatrix} \begin{pmatrix} Rv00 & Rv01 & Rv02 & | & tv0 \\ Rv10 & Rv11 & Rv12 & | & rv1 \\ Rv20 & Rv12 & Rv22 & | & tv2 \end{pmatrix} \quad \text{(Equation 2)}$$

In the equation, "fv" is the focal length in photographing the image signal that is currently being displayed on display unit 13. "Uvo" and "Vvo" are the values which indicate the center of pixels where the image signal is currently being displayed on display unit 13. "Rv" is the rotation matrix in the image signal currently being displayed. Finally, "tv" is the translation vector in the image signal currently being displayed. Controller 11 acquires every piece of the information described above from the calibration data.

Next, controller 11 extracts a plurality of the coordinates which satisfy a condition, from the coordinates, on the two-dimensional plane, of the image signal currently being displayed on display unit 13 (Step S505). The thus-extracted coordinates are ones that have been formed in Step S504.

Specifically, controller 11 performs such an extraction as follows: The controller calculates a distance between the point defied by the coordinates acquired in Step S502 and each of the points defined by the coordinates, on the two-dimensional plane, of the image signal currently being displayed on display unit 13. Then, based on the thus-calculated distances, controller 11 extracts the coordinates that provide the distance not longer than a predetermined distance. Next, controller 11 determines to extract coordinates, in the three-dimensional space, corresponding to the coordinates acquired in Step S505. After that, controller 11 calculates a distance between the point defined by the extracted three-dimensional-space coordinates and the camera position in photographing the image signal currently being displayed on display unit 13 (Step S506).

Finally, controller 11 acquires the coordinates having the calculated distance being the shortest. In this way, the thus-acquired coordinates in the three-dimensional space are determined where the label information is to be assigned (Step S507).

Note that, in this case, the 3-D model data held in the holding unit are the three-dimensional point group. When polygon data are given, the intersection points of the polygon may be used as the 3-D model data, with such intersection points being determined by the planes defined by the polygon point group.

With this configuration, the coordinates of the designated position in the three-dimensional space can be calculated from the coordinates on the two-dimensional plane, with the coordinates having been designated by the user while viewing the image signal.

(2) Function of Selecting at Least One Specific Image Signal from Plurality of Image Signals Stored in Multi-Viewpoint Image-Signal Holding Unit 16

Figure 6:
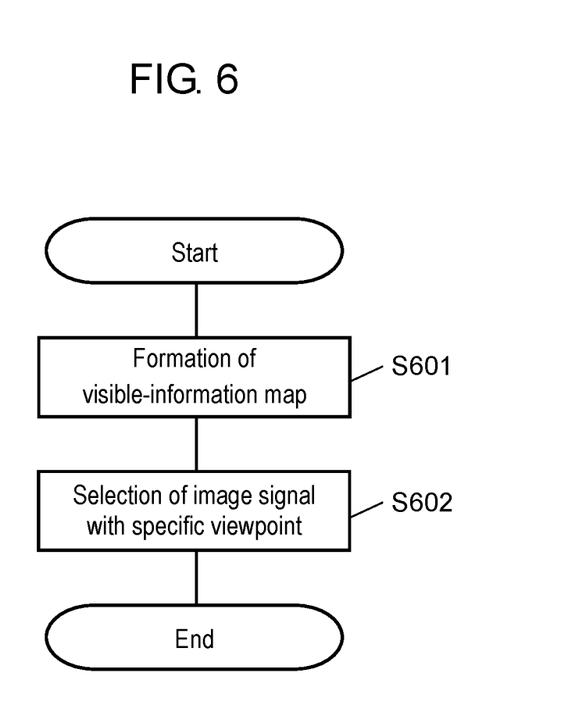
FIG. 6 is a flowchart illustrating an operation of the controller for selecting at least one or more image signals.

FIG. 6 is a flowchart illustrating the operation of controller 11 for selecting at least one or more image signals.

Controller 11 forms a visible-information map that shows whether or not remarkable portion 31 is visible in the image when the image is displayed on display unit 13 based on each of the image signals stored in multi-viewpoint image-signal holding unit 16 (Step S601).

Then, from pieces of the information shown in the visible-information map formed in Step S601, controller 11 selects an image signal having a specific viewpoint when it is determined that remarkable portion 31 is visible in the image based on the thus-selected image signal (Step S602).

Figure 7:
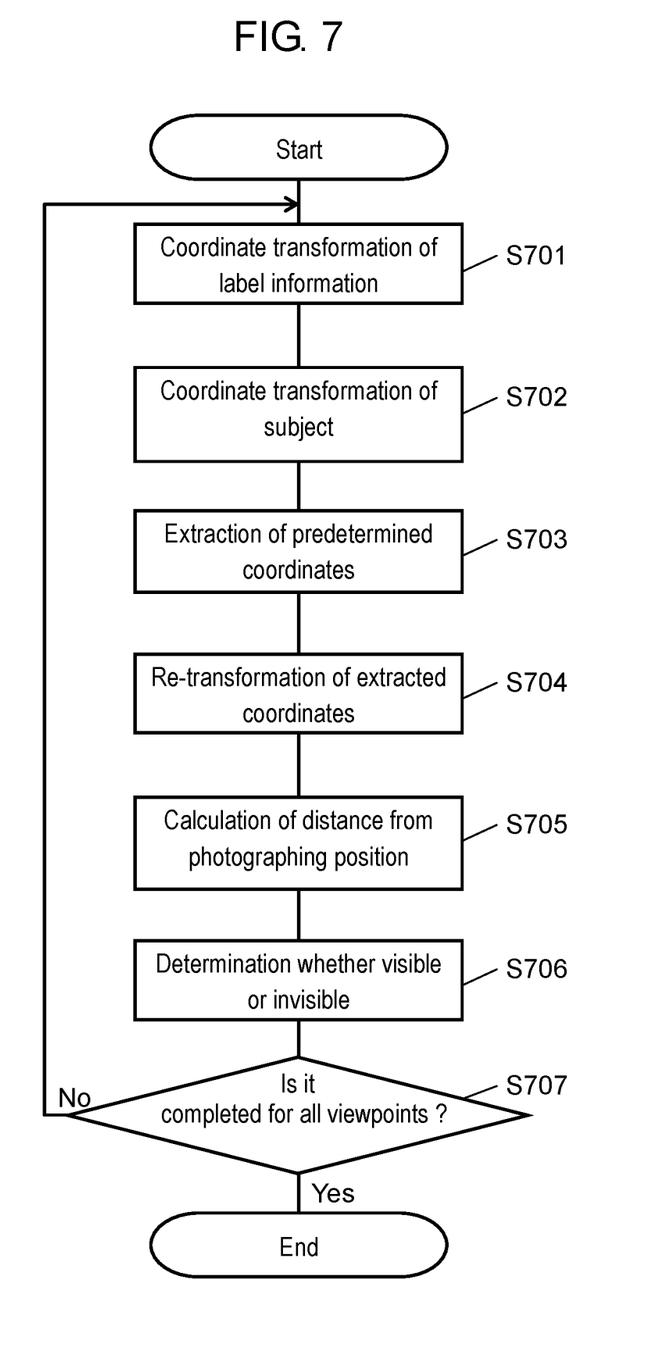
FIG. 7 is a flowchart illustrating an operation of the controller for forming a visible-information map.

FIG. 7 is a flowchart illustrating the operation of controller 11 for forming the visible-information map.

First, as shown in FIG. 7, controller 11 projectively transforms the coordinates, in the three-dimensional space, of the label information acquired in Step S507 of FIG. 5 into coordinates, on the two-dimensional plane, of the image signal to be processed (Step S701).

Next, by using the model data accumulated in model-data holding unit 14, controller 11 projectively transforms the coordinates, in the three-dimensional space, of each of the points on the subject into coordinates, on the two-dimensional plane, of the image signal to be processed (Step S702).

Next, controller 11 calculates a distance between the points defined by the above coordinates described above: That is, the distances is between the point defined by the coordinates, on the two-dimensional plane, of the label information with the coordinates having been obtained by the projective transformation in Step S701, and each of the points defined by the coordinates, on the two-dimensional plane, of the subject with the coordinates having been obtained by the projective transformation in Step S702. Then, by using the thus-calculated distances for these points, controller 11 extracts the coordinates, on the two-dimensional plane, of a point of the subject when the point provides the calculated distance not longer than a predetermined value (Step S703).

Next, controller 11 re-transforms the coordinates extracted in Step S703 again into coordinates on the three-dimensional space (Step S704).

Next, controller 11 calculates a distance between the photographing position of the camera in photographing the image signal to be processed and each of the following points: That is, the point defined by the coordinates of the label information in the three-dimensional space, and the points of the subject in the three-dimensional space, with the points having been obtained by the re-transformation in Step S704 (Step S705).

Then, controller 11 determines whether or not remarkable portion 31 is visible in the image signal to be processed. When, of the distances calculated in Step S705, the distance for the coordinates of the label information is the shortest, the controller determines that remarkable portion 31 is visible in the corresponding image signal to be processed (Step S706).

Upon completing these processes, controller 11 proceeds from this to-be-processed image signal to the next one, and then repeats processes Steps S701 to S706 for the next one (Step S707). These processes are repeatedly performed for every image signal, i.e. for all of the viewpoints, which completes all the processes.

Figure 8:
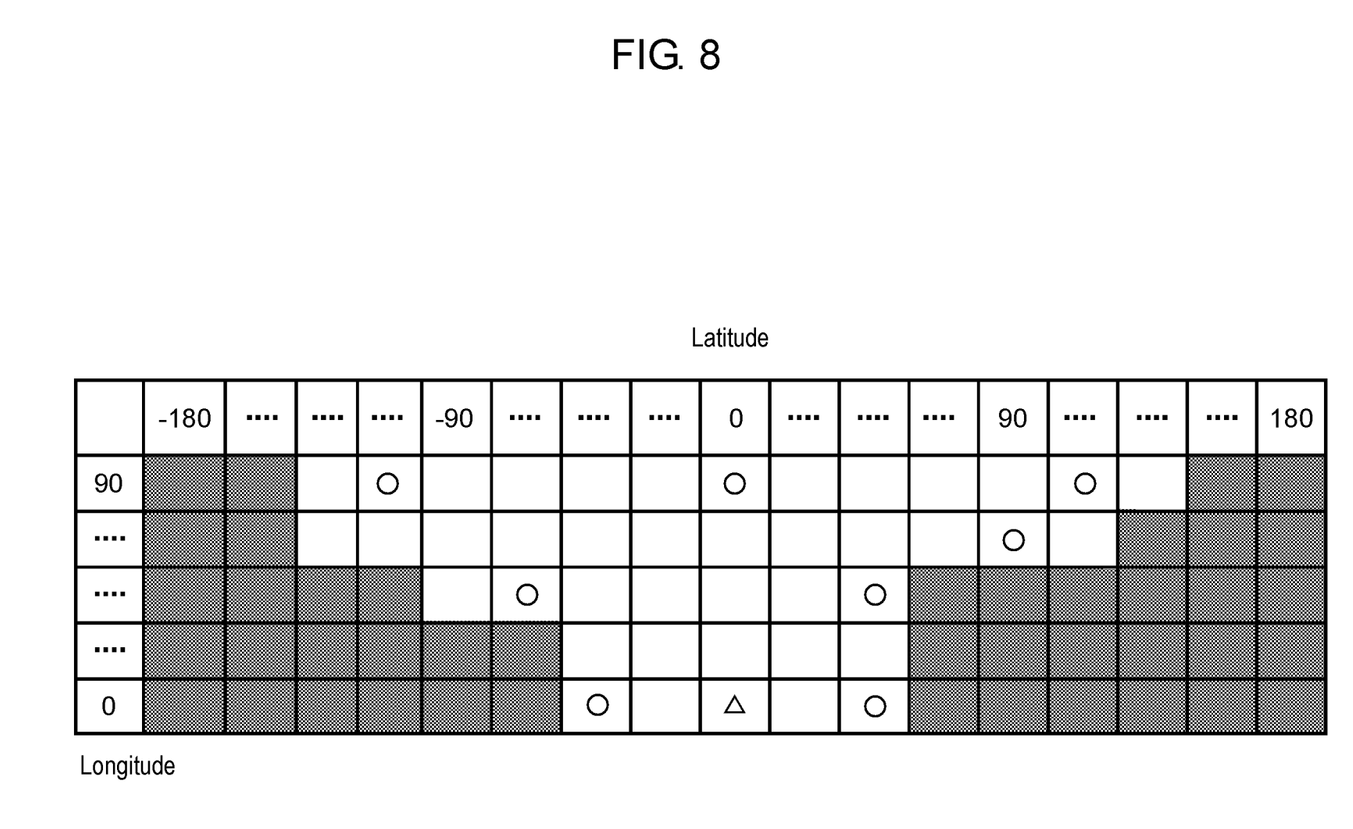
FIG. 8 is an illustrative view of an example of the visible-information map which the controller forms.

FIG. 8 is an illustrative view of an example of the visible-information map that the controller forms. In FIG. 8, the horizontal axis represents the latitude, while the vertical axis represents the longitude. In FIG. 8, for the image signals belonging to the shaded areas, it is determined that the remarkable portions involved in the selection are not visible in the image signals. In contrast, for the image signals belonging to not-shaded areas, it is determined that the remarkable portions involved in the selection are visible in the image signals.

Referring to the thus-formed visible-information map, controller 11 selects a plurality of the image signals which are each different from the image signal currently being displayed on display unit 13. In this case, controller 11 selects the plurality of the image signals, based on both the visible-information map and the information on the camera positions in photographing. Such selected image signals are ones in which the remarkable portions are visible according to the visible-information map and the corresponding camera positions are separated at regular intervals. In short, the camera positions in photographing the plurality of the selected image signals are separated from each other at intervals not shorter than a predetermined distance. Moreover, in selecting the plurality of the image signals, controller 11 may select the plurality of the image signals such that their camera positions in photographing the image signals are separated from each other at regular intervals each equal to a certain distance.

Note that controller 11 may be configured to display the image signal on display unit 13, in the following manner. When, in visible-information map, the image signal belonging to the remarkable-portion-visible area is located adjacent to the invisible area, such an image signal is displayed after the region containing at least the remarkable portion is magnified. This is because, in such an image signal, the remarkable portion may be visible, but highly possibly difficult to view. Therefore, the magnified display in this way allows the user to have increased visibility of the image.

As described above, the label-information processing device according to the embodiment of the present disclosure is a device for processing label information which is assigned to a remarkable portion that is depicted in and common to the images based on a plurality of image signals obtained by photographing a specific subject from multi-viewpoints. The label-information processing device includes display unit 13 for displaying an image based on a specific image signal in which the remarkable portion is depicted, and controller 11 for assigning the label information to the remarkable portion of the image that is displayed on the display unit based on the specific image signal.

Controller 11 has first, second, third, and fourth functions. The first function is for acquiring coordinates, in a three-dimensional space, of the label information in a coordinate space, with such coordinates being ones in the coordinate space which has been used to express the subject in the three-dimensional space. The second function is for displaying, on display unit 13, other images based on other image signals, which are each different in viewpoint from the specific image based on the specific image signal, with such other images each depicting the same remarkable portion as that is depicted by the specific image. The third function is for transforming the coordinates of the label information, which have been acquired by the first function, into coordinates of the label information on a plane. The thus-transformed coordinates is to be used for assigning the label information to the image signals, on a per image signal basis, with the image signals having different viewpoints and being displayed by the second function. The fourth function is for assigning the label information, on a per image signal basis, to the image signals having the different viewpoints, at coordinate positions predetermined from the coordinates having been acquired by the third function. Moreover, the method of processing label information according to the embodiment of the technology disclosed herein is of processing the label information for multi-viewpoint images. In the method, the label information is assigned to the remarkable portion which is depicted in and common to the images based on the plurality of image signals that have been obtained by photographing the specific subject from the plurality of viewpoints.

The method includes the steps of: specifying an image signal from the plurality of the image signals with the specified image signal depicting the remarkable portion, displaying an image based on the specified image signal on the display unit, and assigning the label information to the remarkable portion of the image displayed on the display unit; acquiring coordinates of the label information in a coordinate space with the coordinates being ones in the coordinate space which has been used to express a subject in the three-dimensional space; displaying, on the display unit, images based on the image signals different in viewpoint from the image based on the specified image signal, with the images each depicting the same remarkable portion as that is depicted by the specified image signal; and calculating coordinates where the label information on a plane is assigned to each of the image signals that depict the images having different viewpoints from each other, and then displaying the images based on the image signals to which the label information is assigned at the predetermined coordinate positions of the image signals having the different viewpoints.

Moreover, in the embodiment, the photographing positions in photographing the image signals are separated from each other by a predetermined distance, with the image signals each depicting the same remarkable portion as that is depicted by the specified image signal.

In addition, in the embodiment, an image signal of the specified image signals, which satisfies a condition described below, is controlled such that the image based on the image signal is displayed after a certain region, in the image, containing the remarkable portion has been magnified. The condition is that another image signal of the specific image signals depicts no remarkable portion, with such another image signal having a viewpoint adjacent to the viewpoint of the image signal.

As described above, the embodiments have been described to exemplify the technology according to the present disclosure. To that end, the accompanying drawings and the detailed descriptions have been provided. Therefore, the constituent elements described in the accompanying drawings and the detailed descriptions may include not only essential elements for solving the problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions. Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents. The technology disclosed herein is applicable to label-information processing devices which are capable of assigning label information to a plurality of image signals that are obtained by photographing a subject from a plurality of viewpoints. Specifically, the technology is applicable to an electronic book and the like.

What is claimed is:

1. A label-information processing device for a multi-viewpoint image including plural images obtained by photographing a specific subject from a respective plurality of adjacent viewpoints, the device assigning label information to a remarkable portion depicted in one or more of the images, the device comprising:
   a display unit for displaying, as a to-be-displayed image, a specific image out of the plural images, the specific image including a region depicting the remarkable portion; and
   a controller for assigning the label information to the remarkable portion depicted in the specific image the specific image being displayed on the display unit, wherein the controller has:
   a first function of acquiring coordinates, in a three-dimensional space, of the label information in a coordinate space, the coordinates being in the coordinate space used to express the subject in the three-dimensional space;
   a second function of displaying, on the display unit, as the to-be-displayed image, a different image having a viewpoint different from the viewpoint of the specific image the different image depicting a remarkable portion identical to the remarkable portion depicted by the specific image;
   a third function of transforming the coordinates, acquired by the first function, of the label information into coordinates, on a plane, at which the label information is assigned to each of the images, the images being displayed on the display unit by the second function, the images having the different viewpoints from each other; and
   a fourth function of assigning the label information to each of the images, having the different viewpoints from each other, at predetermined positions obtained from the coordinates transformed by the third function,
   wherein, when the to-be-displayed image includes the region depicting the remarkable portion and satisfies a condition that an image having a viewpoint adjacent to the viewpoint of the to-be-displayed image depicts no remarkable portion, the controller magnifies the region depicting the remarkable portion in the to-be-displayed image before displaying the to-be-displayed image.

2. The label-information processing device for the multi-viewpoint image according to claim 1, wherein photographing positions of the plural images, having the respective plurality of adjacent viewpoints, are separated from each other by distances not shorter than a predetermined distance.

3. The label-information processing device for the multi-viewpoint image according to claim 1, wherein photographing positions of the plural images, having the respective plurality of adjacent viewpoints, are separated from each other by a constant distance.

4. A method of processing label for a multi-viewpoint image including plural images obtained by photographing a specific subject from a respective plurality of adjacent viewpoints, the label information being assigned a remarkable portion depicted in one or more of the images, the method comprising:
   displaying, on a display unit, as a to-be-displayed image, a specific image out of the plural images, the specific image including a region depicting the remarkable portion;
   acquiring coordinates, in a three-dimensional space, of the label information in a coordinate space, the coordinates being in the coordinate space used to express the subject in the three-dimensional space;
   displaying, on the display unit, as the to-be-displayed image, a different image having a viewpoint different from the viewpoint of the specific image, the different image depicting a remarkable portion identical to the remarkable portion depicted by the specific image;
   transforming the coordinates of the label information into coordinates, on a plane, at which the label information is assigned to each of the images, the images being displayed on the display unit, the images having the different viewpoints from each other; and
   assigning the label information to each of the images, having the different viewpoints from each other, at predetermined positions obtained from the transformed coordinates, wherein, when the to-be-displayed image includes the region depicting the remarkable portion and satisfies a condition that an image having a viewpoint adjacent to the viewpoint of the to-be-displayed image depicts no remarkable portion, the controller magnifies the region depicting the remarkable portion in the to-be-displayed image before displaying the to-be-displayed image.

5. The method according to claim 4, wherein photographing positions of the plural images, having the respective plurality of adjacent viewpoints, are separated from each other by distances not shorter than a predetermined distance.

6. The method according to claim 4, wherein photographing positions of the plural images, having the respective plurality of adjacent viewpoints, are separated from each other by a constant distance.

* * * * *